United States Patent
Kuo et al.

(10) Patent No.: US 10,267,906 B2
(45) Date of Patent: Apr. 23, 2019

(54) ANGLE ESTIMATING METHOD AND RADAR SYSTEM

(71) Applicant: Wistron NeWeb Corporation, Hsinchu (TW)

(72) Inventors: Chi-Cheng Kuo, Hsinchu (TW);
Hsin-Lung Hsiao, Hsinchu (TW);
Jeng-Da Li, Hsinchu (TW)

(73) Assignee: Wistron NeWeb Corporation, Hsinchu, Taiwan (CN)

( * ) Notice: Subject to any disclaimer, the term of this patent is extended or adjusted under 35 U.S.C. 154(b) by 339 days.

(21) Appl. No.: 15/249,490

(22) Filed: Aug. 29, 2016

(65) Prior Publication Data
US 2017/0285159 A1 Oct. 5, 2017

(30) Foreign Application Priority Data
Mar. 30, 2016 (TW) .............................. 105110171 A (51) Int. Cl.
*G01S 13/06* (2006.01)
*H01Q 21/08* (2006.01)
*G01S 13/93* (2006.01)
*G01S 13/00* (2006.01)
*G01S 13/02* (2006.01)

(52) U.S. Cl.
CPC ............ *G01S 13/06* (2013.01); *G01S 13/931* (2013.01); *H01Q 21/08* (2013.01); *G01S 13/003* (2013.01); *G01S 2013/0263* (2013.01)

(58) Field of Classification Search
CPC ...... G01S 13/06; G01S 13/003; G01S 13/931; G01S 2013/0263; H01Q 21/08
USPC ......................................................... 342/147
See application file for complete search history.

(56) References Cited

U.S. PATENT DOCUMENTS

| 2016/0033669 A1* | 2/2016 | Bittar ................ E21B 47/024 324/339 |
| 2016/0091595 A1* | 3/2016 | Alcalde .............. G01S 13/4454 342/175 |

FOREIGN PATENT DOCUMENTS

| CN | 102419432 A | 4/2012 |
| CN | 103323811 A | 9/2013 |
| EP | 3 001 221 A1 | 3/2016 |

* cited by examiner

*Primary Examiner* — Timothy A Brainard
(74) *Attorney, Agent, or Firm* — Winston Hsu (57) ABSTRACT

An angle estimating method applied in a radar system includes receiving a first signal and a second signal reflected from a target object via a first antenna and a second antenna; obtaining a first phase difference and at least one virtual phase difference, where the first phase difference is a phase difference between the first antenna and the second antenna; and obtaining a direction of arrival (DOA) of the target object according to the first phase difference and the at least one virtual phase difference.

19 Claims, 6 Drawing Sheets

ANGLE ESTIMATING METHOD AND RADAR SYSTEM

BACKGROUND OF THE INVENTION

1. Field of the Invention

The present invention relates to an angle estimation method and a radar system, and more particularly, to an angle estimation method and a radar system capable of enhancing angle estimation accuracy.

2. Description of the Prior Art

Phase impulse radar systems are usually equipped with one transmit antenna and two receive antennas. The radar system estimates an angle/direction of arrival (DOA) of a target object via a time difference of signals received by the different receive antennas. Specifically, the radar system may generate the phase difference corresponding to the time difference of received signals from different antennas. Since the phase difference and the DOA of the target have a specific corresponding relationship, after the radar system obtains the phase difference of the received signals from different antennas, the radar system may compute the DOA of the target object. An accuracy of angle estimation depends on how the time difference between antennas is matched to a theoretical value. If the estimated angle is closer to the theoretical value, the estimation accuracy is higher. Otherwise, the estimated angle may have an error in different degree.

In practice, factors of affecting the time difference could be length/material of a path between antenna(s) and a backend signal processing apparatus, sampling time of the antennas, and medium of the radar wave emitted by the radar system toward the target object. The former two factors may be calibrated by proper design and compensated through a manufacturing process. The latter factor, which is the medium of the radar wave emitted by the radar system toward the target object, depends on the practical environment of the radar system. Take a vehicular radar system as an example, since the vehicle radar system is disposed within a bumper, a time difference would be affected by a curveness and a material of the bumper, and a phase ambiguity occurs. That is, different angles may correspond to a same phase difference, which may degrade an accuracy of DOA estimation.

To reduce angle estimation error brought by the phase ambiguity, the prior art enhance the accuracy of DOA estimation by including more antennas and increasing distance (s) between the antennas. However, including more antennas and increasing the distances between the antennas would enlarge the disposing space for the radar system, which is not good for the vehicular radar system. Therefore, how to enhance DOA estimation accuracy without enlarging the disposing area of the antennas within the radar system is a significant objective in the field.

SUMMARY OF THE INVENTION

It is therefore a primary objective of the present invention to provide an angle estimation method and a radar system capable of enhancing angle estimation accuracy without increasing disposing area of antenna, to improve over disadvantages of the prior art.

An embodiment of the present invention discloses an angle estimating method applied in a radar system. The angle estimating method comprises receiving a first signal and a second signal reflected from a target object via a first antenna and a second antenna; obtaining a first phase difference and at least one virtual phase difference according to the first signal and the second signal, wherein the first phase difference is a phase difference between the first antenna and the second antenna; and obtaining a DOA of the target object according to the first phase difference and the at least one virtual phase difference.

An embodiment of the present invention further discloses a radar system comprising a first antenna configured to receive a first signal reflected from a target object; a second antenna configured to receive a second signal reflected from the target object; a processing unit coupled to the first antenna and the second antenna; and a storage unit, configured to store a program code, the program code instructing the processing unit to perform steps of obtaining a first phase difference and at least one virtual phase difference according to the first signal and the second signal; and obtaining a DOA of the target object according to the first phase difference and the at least one virtual phase difference, wherein the first phase difference is a phase difference between the first antenna and the second antenna, and the at least one virtual phase difference is phase difference between the first antenna and at least one virtual antenna.

An embodiment of the present invention further discloses a radar system comprising a first antenna configured to receive a first signal reflected from a target object; a second antenna configured to receive a second signal reflected from the target object; a phase difference computing unit configured to obtain a first phase difference and at least one virtual phase difference according to the first signal and the second signal, wherein the first phase difference is a phase difference between the first antenna and the second antenna, and the at least one virtual phase difference is phase difference between the first antenna and at least one virtual antenna; and a DOA computing unit configured to obtain a DOA of the target object according to the first phase difference and the at least one virtual phase difference.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
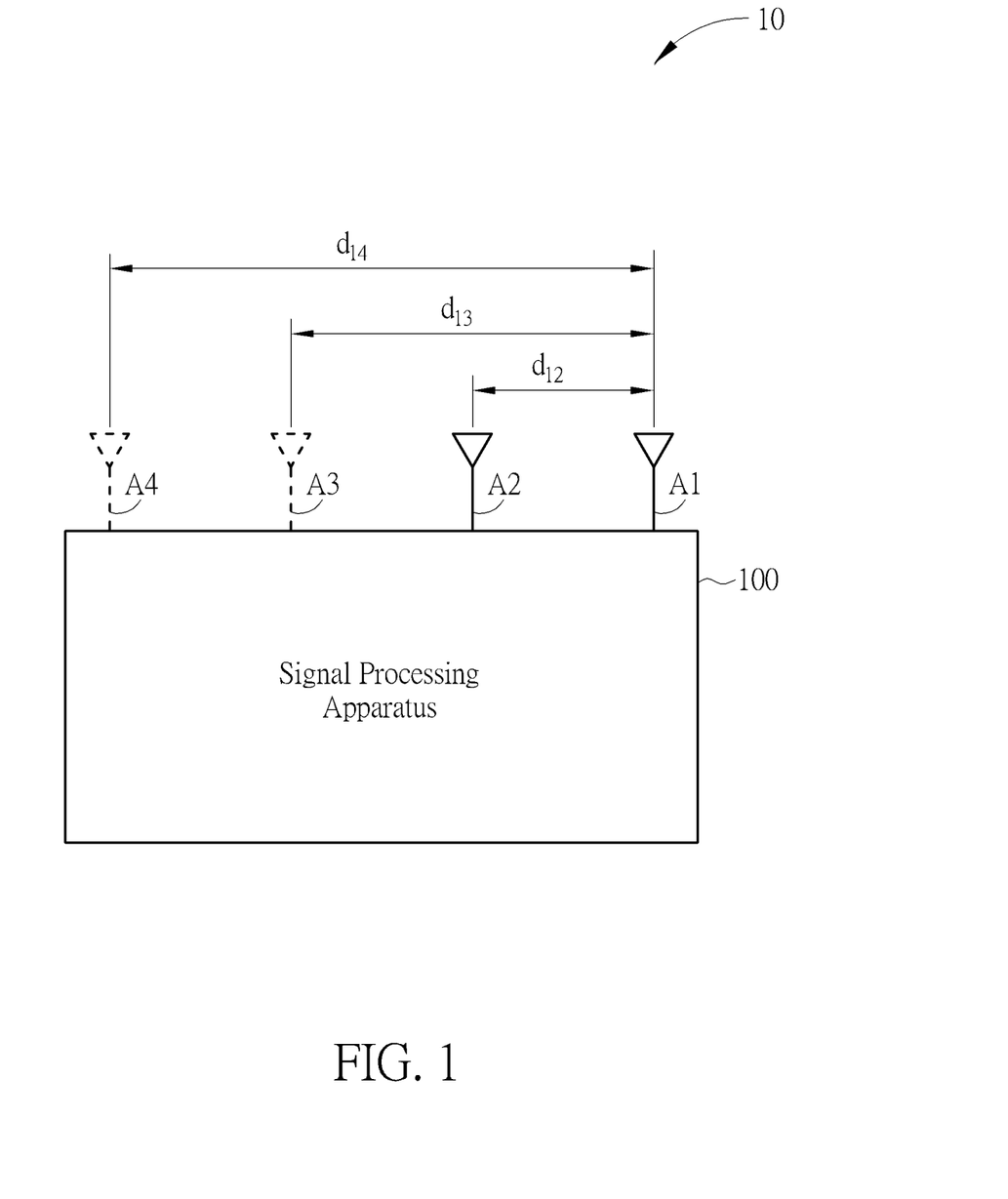
FIG. 1 is a schematic diagram of an antenna array according to an embodiment of the present invention.

FIG. 1 is a schematic diagram of a radar system 10 according to an embodiment of the present invention. The radar system 10 comprises physical antennas (A1 and A2), virtual antennas (A3 and A4), and a signal processing apparatus 100. The antennas A1~A4 form as an antenna array. The antennas A2, A3, A4 have distances $d_{12}$, $d_{13}$, $d_{14}$ relative to the antenna A1. The antennas A1~A4 are linearly arranged with equal spacing, i.e., the distance $d_{13}$ between the antennas A1 and A3 is twice of the $d_{12}$, and the distance $d_{14}$ between the antennas A1 and A4 is three times of the distance $d_{12}$. The antennas A1~A4 are configured to receive signals y1~y4 reflected from a target object. The antennas A1~A4 are coupled to the signal processing apparatus 100. The signal processing apparatus 100 computes a direction of arrival (DOA) θ, which is a DOA of the target object, according to the signals y1~y4. Specifically, the signal processing apparatus 100 computes phase differences $\varphi_{12}$, $\varphi_{13}$ and $\varphi_{14}$ of the antennas A2, A3 and A4 with respect to the antenna A1, obtains angle estimation values $\theta_{12}$, $\theta_{13}$ and $\theta_{14}$ of the DOA θ according to the phase differences $\varphi_{12}$, $\varphi_{13}$ and $\varphi_{14}$, and obtains the DOA θ according to the angle estimation values $\theta_{12}$, $\theta_{13}$ and $\theta_{14}$.

Figure 2:
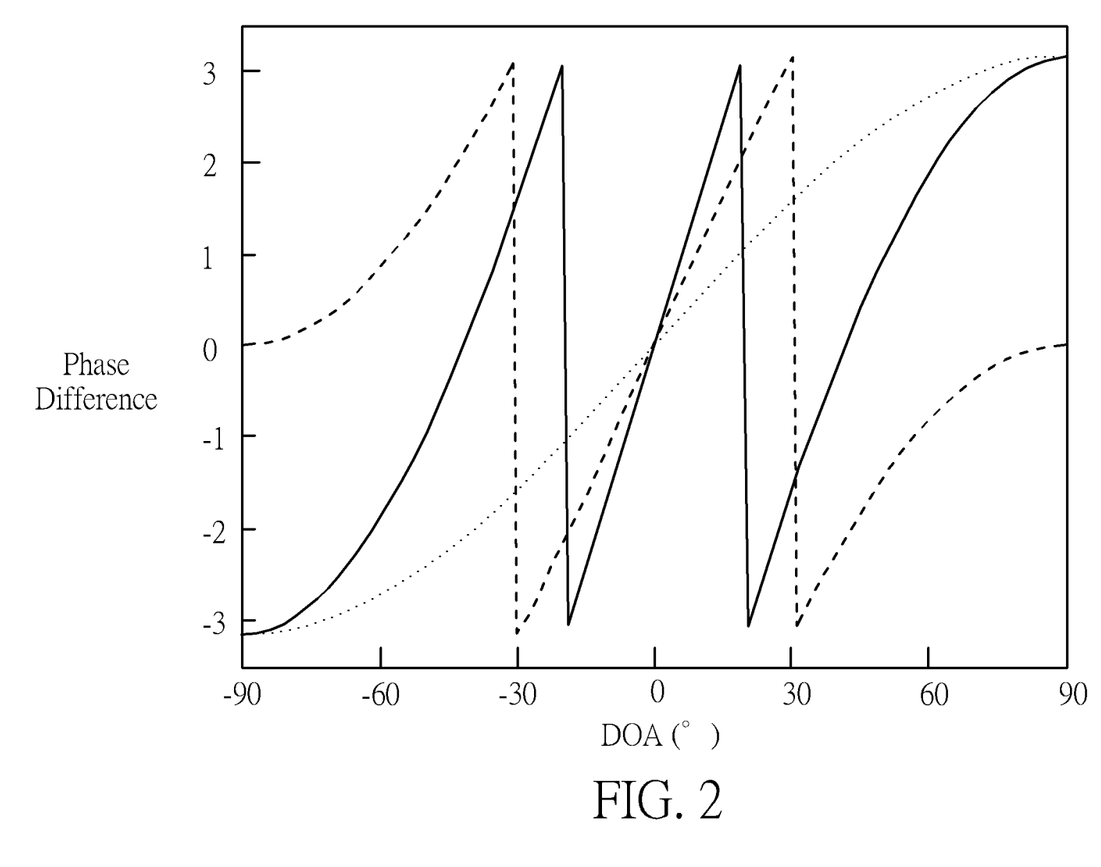
FIG. 2 is a schematic diagram of a relationship of phase difference versus angle.

In general, accuracy/sensitivity of DOA estimation is related to the distance between the antennas. The longer the distance, the larger the variation rate of the phase difference versus the DOA. FIG. 2 is a schematic diagram of a relationship of phase difference φ versus an DOA θ. In FIG. 2, a dotted line represents a corresponding relationship of a phase difference $\varphi_{12}$ versus the DOA θ, when the distance $d_{12}$ is λ/2, where λ represents a wave length of radar signal. A dashed line/curve represents a corresponding relationship of a phase difference $\varphi_{13}$ versus the DOA θ, when the distance $d_{13}$ is λ. A solid line/curve represents the corresponding relationship of a phase difference $\varphi_{14}$ versus the DOA θ, when the distance $d_{14}$ is 3λ/2. As can be seen from FIG. 2, a variation rate of the phase difference $\varphi_{14}$ versus the DOA θ is the rapidest, and the angle estimation value $\theta_{14}$ derived from the phase difference $\varphi_{14}$ is the most accurate. A variation rate of the phase difference $\varphi_{13}$ versus the DOA θ is the second most rapid. A variation rate of the phase difference $\varphi_{12}$ versus the DOA θ is the smallest, and the angle estimation value $\theta_{12}$ derived from the phase difference $\varphi_{12}$ is the least accurate.

In another perspective, the distance between the antenna A1 and the antenna A3 (or the antenna A4) is larger than a half of wavelength. Thus, the phase difference $\varphi_{13}$ (or the phase difference $\varphi_{14}$) has a phase wrapping phenomenon, i.e., the phase difference $\varphi_{13}$ (or the phase difference $\varphi_{14}$) has a non-one-to-one corresponding relationship with the DOA θ, such that the phase difference $\varphi_{13}$ would be corresponding to a plurality of angle estimation values $\theta_{13}$, which is a phase ambiguity phenomenon. Similarly, the phase difference $\varphi_{14}$ would be corresponding to a plurality of angle estimation values $\theta_{14}$. To avoid phase ambiguity, the signal processing apparatus 100 has to refer back to the angle estimation value $\theta_{12}$, so as to achieve accurate angle estimation.

Notably, when the antennas A1~A4 are arranged with equal spacing, the phase differences $\varphi_{13}$ and $\varphi_{14}$ have a simple corresponding relation with the phase difference $\varphi_{12}$ (or the signals y1 and y2). In other words, the signal processing apparatus 100 of the radar system 10 may simply derive the phase differences $\varphi_{13}$ and $\varphi_{14}$ from the signals y1 and y2 (or from the phase difference $\varphi_{12}$), to achieve better angle estimation accuracy and avoid phase ambiguity at the same time.

Specifically, the signal processing apparatus 100 may derive the phase difference $\varphi_{12}$ between the antennas A1 and A2 according to the signals y1 and y2. The derivation is described as follows. The signal y1 and y2 has a relation as $$y2 = y1 * \exp\{j\varphi_{12}\} = y1 * \exp\left\{\frac{j2\pi d_{12}\sin\theta}{\lambda}\right\}, \text{ where } \varphi_{12} = \frac{2\pi d_{12}\sin\theta}{\lambda}.$$

Hence, the signals y1, y2 and the phase difference $\varphi_{12}$ have a relation as $$\frac{y2}{y1} = \exp\{j\varphi_{12}\}, \text{ i.e., } \frac{y2}{y1} = \cos(\varphi_{12}) + j\sin(\varphi_{12}),$$

which implies that the phase difference $\varphi_{12}$ and the signals y1, y2 have a relation as $$\varphi_{12} = \tan^{-1}\left(\frac{\text{Im}\{y2/y1\}}{\text{Re}\{y2/y1\}}\right),$$

where Im{ } represents an imaginary part operator, Re{ } represents a real part operator, and $\tan^{-1}$ represents an inverse function of a tangent function. Therefore, the signal processing apparatus 100 may derive the phase difference $\varphi_{12}$ between the antenna A1 and the antenna A2 from the signals y1 and y2, and derives the angle estimation value $\theta_{12}$ from the phase difference $\varphi_{12}$, i.e., $\theta_{12}=\sin^{-1}(\varphi_{12}\lambda/2\pi d_{12})$. Notably, since the distance $d_{12}$ is half wavelength λ/2 long, the angle estimation value $\theta_{12}$ and the phase difference $\varphi_{12}$ have an one-to-one relationship. On the other hand, since the distances $d_{13}$ and $d_{14}$ are longer than the half wavelength, the phase ambiguity would occur, i.e., the angle estimation values $\theta_{13}/\theta_{14}$ does not have the one-to-one relationship with the phase difference $\varphi_{13}/\varphi_{14}$.

Furthermore, the signal processing apparatus 100 may derive the phase differences $\varphi_{13}$ and $\varphi_{14}$ according to the signals y1 and y2 (or according to the phase difference $\varphi_{12}$). Moreover, the phase difference $\varphi_{13}$ and the phase difference $\varphi_{12}$ have a relation as $\varphi_{13}=2\varphi_{12}$, and the phase difference $\varphi_{13}$ and the signals y1, y2 have a relation as $$\varphi_{13} = \tan^{-1}\left(\frac{\text{Im}\{(y2/y1)^2\}}{\text{Re}\{(y2/y1)^2\}}\right).$$

Thus, the signal processing apparatus 100 may utilize the equations stated in the above to derive the phase difference $\varphi_{13}$ according to the signals y1 and y2 (or according to the phase difference $\varphi_{12}$). Similarly, the phase difference $\theta_{14}$ and the phase difference $\varphi_{12}$ have a relation as $\varphi_{14}=3\varphi_{12}$, and the phase difference $\varphi_{14}$ and the signals y1, y2 have a relation as $$\varphi_{14} = \tan^{-1}\left(\frac{\text{Im}\{(y2/y1)^3\}}{\text{Re}\{(y2/y1)^3\}}\right).$$

Thus, the signal processing apparatus 100 may also utilize the equations stated in the above to derive the phase difference $\varphi_{14}$ according to the signals y1 and y2 (or according to the phase difference $\varphi_{12}$).

Derivation of the phase difference $\varphi_{13}$ from the signals y1 and y2 is described as follows. The phase difference $\varphi_{12}$ can be expressed as $$\varphi_{12} = \frac{2\pi d_{12}\sin\theta}{\lambda},$$

and the phase difference $\varphi_{13}$ can be expressed as $$\varphi_{13} = \frac{2\pi d_{13}\sin\theta}{\lambda}.$$

Note that, the distance $d_{13}$ is twice of the distance $d_{12}$, and thus, the phase difference $\varphi_{13}$ can be expressed as $$\varphi_{13} = \frac{2\pi d_{13}\sin\theta}{\lambda} = \frac{2\pi(2d_{12})\sin\theta}{\lambda} = 2\varphi_{12}.$$

In addition, a ratio of the signal y2 and the signal y1 can be expressed as $$\frac{y2}{y1} = \exp\{j\varphi_{12}\},$$

and a ratio of the signal y3 and the signal y1 can be expressed as $$\frac{y3}{y1} = \exp\{j\varphi_{13}\}. \quad \text{(eq. 1-1)}$$

Due to a fact that $\varphi_{13}=2\varphi_{12}$, the ratio of the signals y3 and y1 can be expressed by the ratio of the signals y2 and y1 as $$\frac{y3}{y1} = \left(\frac{y2}{y1}\right)^2. \quad \text{(eq. 1-2)}$$

According to eq. 1-1 and eq. 1-2, the phase difference $\varphi_{13}$ can be expressed as $$\varphi_{13} = \tan^{-1}\left(\frac{\text{Im}\{(y2/y1)^2\}}{\text{Re}\{(y2/y1)^2\}}\right).$$

By similar rationale, the signal processing apparatus 100 may derive the phase difference $\varphi_{14}$ according to the signals y1 and y2 (as $$\varphi_{14} = \tan^{-1}\left(\frac{\text{Im}\{(y2/y1)^3\}}{\text{Re}\{(y2/y1)^3\}}\right),$$

or derive the phase difference $\varphi_{14}$ according to the phase difference $\varphi_{12}$ (as $\varphi_{14}=3\varphi_{12}$), where the detailed derivation is not narrated herein for brevity.

Furthermore, when a distance $d_{1x}$ between an antenna Ax and the antenna A1 is q times of the distance $d_{12}$ (i.e., $d_{1x}=q \cdot d_{12}$), a signal processing apparatus may derive a phase difference $\varphi_{1x}$ according to the signals y1 and y2 (or according to the phase difference $\varphi_{12}$), where q is a real number which is greater than 1. Specifically, the signal processing apparatus may derive the phase difference $\varphi_{1x}=q\varphi_{12}$, or derive the phase difference $$\varphi_{1x} = \tan^{-1}\left(\frac{\text{Im}\{(y2/y1)^q\}}{\text{Re}\{(y2/y1)^q\}}\right).$$

Detailed derivation may be referred to paragraphs stated in the above and not narrated herein for brevity.

As can be seen, the signal processing apparatus 100 may derive the phase differences $\varphi_{13}$ and $\varphi_{14}$ according to the signals y1 and y2 (or according to the phase difference $\varphi_{12}$), to achieve better angle estimation accuracy and avoid phase ambiguity at the same time. That is, the radar system 10 may obtain the phase differences $\varphi_{13}$ and $\varphi_{14}$, to enhance estimation accuracy, without using the physical antennas A3 and A4 to receive the reflected signals y3 and y4. In other words, a radar system could comprise the antennas A1 and A2 only, and achieve the same accuracy as the one achieved by comprising all of the physical antennas A1~A4.

Therefore, in an embodiment of the present invention, a radar system comprises 2 antennas only, and is able to achieve the same accuracy as the one achieved by comprising more than 2 antennas and avoid phase ambiguity at the same time. Specifically, please refer to FIG. 3, which is a schematic diagram of a radar system 30 according to an embodiment of the present invention. The radar system 30 is configured to estimate a DOA $\theta_{DOA}$ of a target object TG related to the radar system 30. The radar system 30 comprises antennas Ant_1 and Ant_2 and a signal processing apparatus 306. The signal processing apparatus 306 comprises a processing unit 300 and a storage unit 302. The antennas Ant_1 and Ant_2 are configured to receive signals r1 and r2 reflected from the target object TG, respectively. A distance d is between the antenna Ant_1 and the antenna Ant_2, where the distance d may be equal to one half of a wavelength of radar signals (i.e., $d=\lambda/2$). The processing unit 300 is coupled to the antennas Ant_1 and Ant_2, so as to receive the signals r1 and r2 from the antennas Ant_1 and Ant_2. The storage unit 302 is configured to store a program code 304, where the program code 304 instructs the processing unit 300 to execute an angle estimation process to estimate the DOA $\theta_{DOA}$ according to the signals r1 and r2. The processing unit 300 may be a central processor unit (CPU), a digital signal processor (DSP) or a microprocessor, and not limited herein. The storage unit 302 may be a read-only memory (ROM) or a non-volatile memory (e.g., an electrically erasable programmable read only memory (EEPROM) or a flash memory), and not limited herein.

Figure 4:
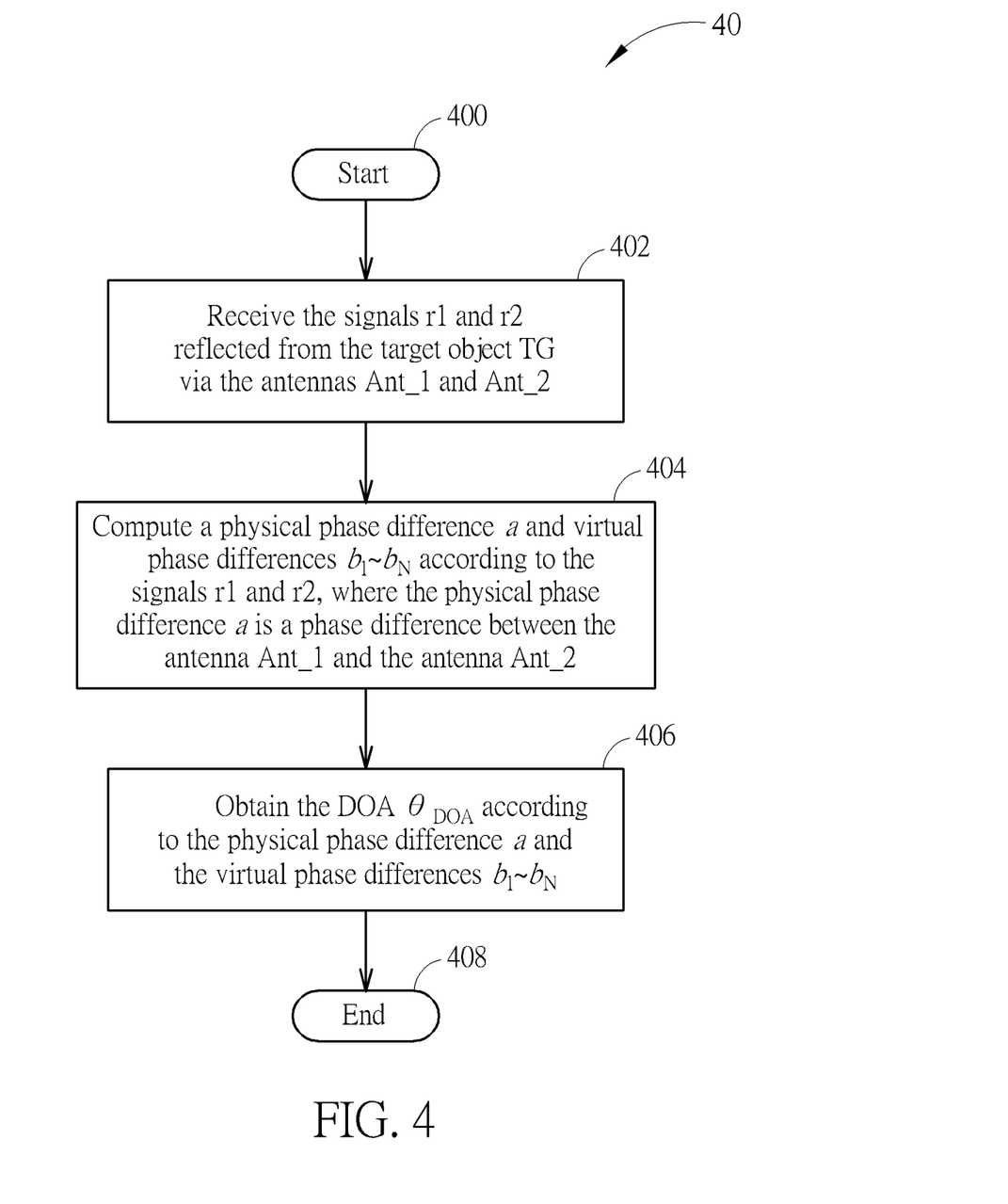
FIG. 4 is a schematic diagram of an angle estimation process according to an embodiment of the present invention.

Please refer to FIG. 4, which is a schematic diagram of an angle estimation process 40 according to an embodiment of the present invention. The angle estimation process 40 may be compiled as the program code 304 and executed by the processing unit 300 of the signal processing apparatus 306. The angle estimation process 40 comprises following steps:

Step 400: Start.

Step 402: Receive the signals r1 and r2 reflected from the target object TG via the antennas Ant_1 and Ant_2.

Step 404: Compute a physical phase difference a and virtual phase differences $b_1$~$b_N$ according to the signals r1 and r2, where the physical phase difference a is a phase difference between the antenna Ant_1 and the antenna Ant_2.

Step 406: Obtain the DOA $\theta_{DOA}$, according to the physical phase difference a and the virtual phase differences $b_1$~$b_N$.

Step 408: End.

Figure 5:
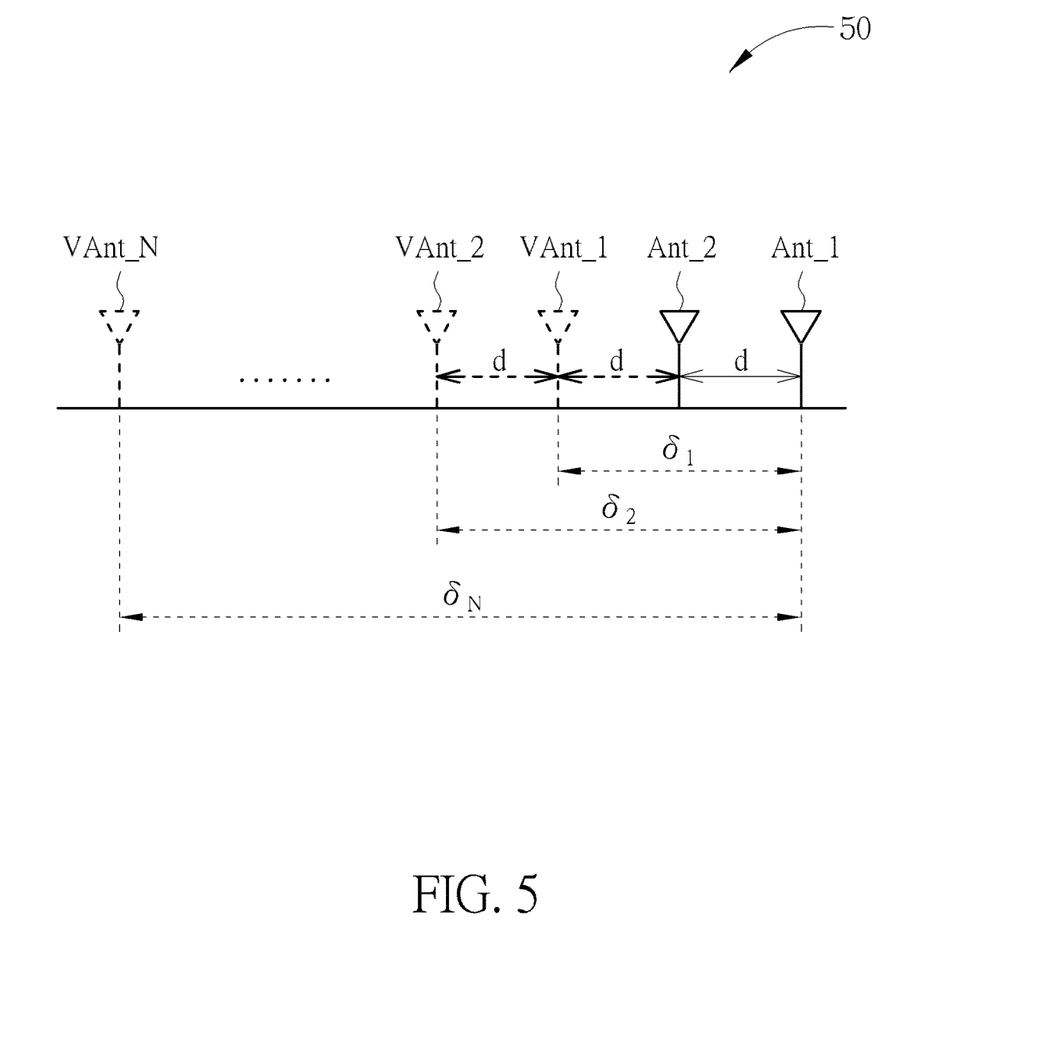
FIG. 5 is a schematic diagram of a virtual antenna array according to an embodiment of the present invention.

Notably, according to the angle estimation process 40, the signal processing apparatus 306 computes the physical phase difference a between the antenna Ant_1 and the antenna Ant_2, in addition, the signal processing apparatus 306 further computes the virtual phase differences $b_1$~$b_N$ according to the signals r1 and r2. It is noted that N is a positive integer, which is greater than or equal to one. When N=1, it means that only one virtual antenna is applied. In practice, the signal processing apparatus 306 virtualizes (or simulates) a plurality of virtual antennas VAnt_1~VAnt_N via the virtual phase differences $b_1$~$b_N$, where the virtual phase differences $b_1$~$b_N$ represents (virtual) phase differences between the virtual antennas VAnt_1~VAnt_N and the antenna Ant_1, such that the antennas Ant_1, Ant_2 and the virtual antennas VAnt_1~VAnt_N form as a virtual antenna array 50, as shown in FIG. 5. In the virtual antenna array 50, the virtual antennas VAnt_1~VAnt_N are not actually disposed within the radar system 30. Instead, only the antennas Ant_1 and Ant_2 are physically disposed within the radar system 30. In addition, in the virtual antenna array 50, the virtual antennas VAnt_1~VAnt_N have virtual distances $\delta_1$~$\delta_N$ from the antenna Ant_1. The virtual distance $\delta_1$ is twice of the distance d, the virtual distance $\delta_2$ is three times of the distance d, and so on. The virtual distance $\delta_N$ is N+1 times of the distance d. In other words, a virtual distance $\delta_n$ among the virtual distances $\delta_1$~$\delta_N$ represents a virtual distance between the antenna Ant_1 and a virtual antenna VAnt_n among the virtual antennas VAnt_1~VAnt_N, and the virtual distance $\delta_2$ can be expressed as $\delta_2 = (n+1)d$.

Figure 3:
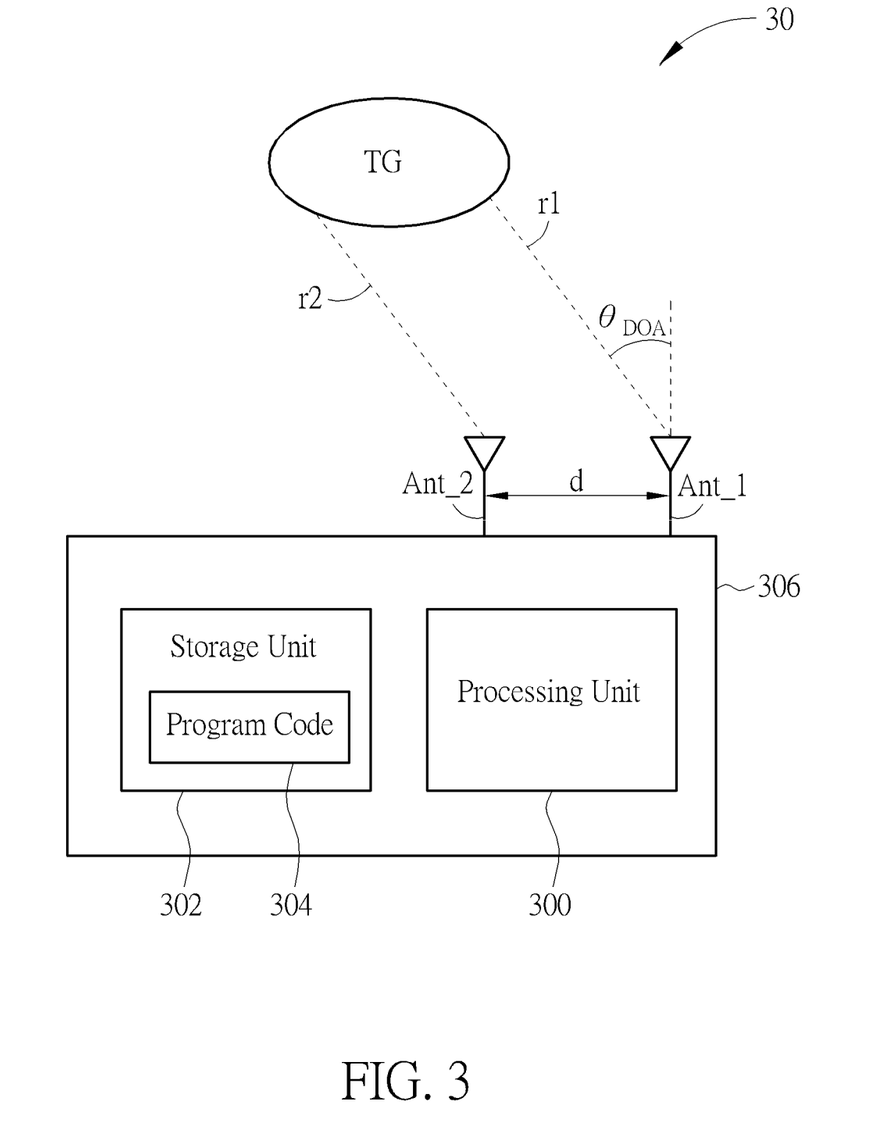
FIG. 3 is a schematic diagram of a radar system according to an embodiment of the present invention.

Although the radar system 30 comprises two physical antennas only (the antennas Ant_1 and Ant_2), according to the angle estimation process 40, the radar system 30 is able to achieve the same accuracy as the one achieved by comprising N+2 antennas and avoid phase ambiguity.

Detailed operations of the angle estimation process 40 are described as follows. In Step 404, the signal processing apparatus 306 computes the physical phase difference a according to the signals r1 and r2. Specifically, the signal processing apparatus 306 computes a ratio R between the signal r2 and the signal r1, and the ratio R can be expressed as R=r2/r1. Then, the signal processing apparatus 306 computes the physical phase difference a according to the ratio R, i.e., to compute the physical phase difference a as $$a = \tan^{-1}\left(\frac{\text{Im}\{R\}}{\text{Re}\{R\}}\right)$$

(eq. 4-1). Rationale of using eq. 4-1 to compute the physical phase difference a according to the ratio R is referred to paragraphs stated in the above, which is not narrated herein for brevity.

In addition, the signal processing apparatus 306 also computes the virtual phase differences $b_1$~$b_N$ according to the signals r1 and r2. In an embodiment, the signal processing apparatus 306 may compute the virtual phase differences $b_1$~$b_N$ directly from the ratio R. That is, the signal processing apparatus 306 may compute a virtual phase difference $b_n$ among the virtual phase differences $b_1$~$b_N$ as $$b_n = \tan^{-1}\left(\frac{\text{Im}\{R^{n+1}\}}{\text{Re}\{R^{n+1}\}}\right), \quad \text{(eq. 4-2)}$$

where the virtual phase difference $b_n$ represents the virtual phase difference between the virtual antenna VAnt_n and the antenna Ant_1. In another embodiment, the signal processing apparatus 306 may compute the virtual phase differences $b_1$~$b_N$ from the physical phase difference a. That is, the signal processing apparatus 306 may compute the virtual phase difference $b_n$ as $b_n=(n+1)a$ (eq. 4-3). Rationale of using eq. 4-2 to compute the virtual phase differences $b_1$~$b_N$ according to the ratio R and rationale of using eq. 4-3 to compute the virtual phase differences $b_1$~$b_N$ according to the physical phase difference a can be referred to paragraphs stated in the above, which is not narrated herein for brevity. Therefore, the signal processing apparatus 306 may obtain the virtual phase differences $b_1$~$b_N$ according to the signals r1 and r2.

In Step 406, the signal processing apparatus 306 obtains the DOA $\theta_{DOA}$ according to the physical phase difference a and the virtual phase differences $b_1$~$b_N$. Specifically, the signal processing apparatus 306 may compute a physical angle c according to the physical phase difference a, and computes the plurality of virtual angles according to the virtual phase differences $b_1$~$b_N$. Finally, the signal processing apparatus 306 obtains the DOA $\theta_{DOA}$ according to the physical angle c and the plurality of virtual angles.

In detail, the signal processing apparatus 306 may use the physical phase difference a to compute the physical c as $$c = \sin^{-1}\left(\frac{a\lambda}{2\pi d}\right).$$

As the distance d is half wavelength $\lambda/2$ long, the physical angle c has the one-to-one relationship with the physical phase difference a, i.e., the signal processing apparatus 306 would obtain one single physical angle c according to one single physical phase difference a. In addition, the signal processing apparatus 306 obtains the plurality of virtual angles according to the virtual phase differences $b_1$~$b_N$, respectively. Since the virtual phase differences $b_1$~$b_N$ represent the (virtual) phase difference between the virtual antennas VAnt_1~VAnt_N and the antenna Ant_1, and the virtual distances $\delta_1$~$\delta_N$ are all greater than the distance d (i.e., the virtual distances $\delta_1$~$\delta_N$ are all greater than the half wavelength $\lambda/2$), regarding to phase wrapping, one virtual phase difference would correspond to a plurality of virtual angles. Take the virtual phase difference $b_n$ as an example, the signal processing apparatus 306 may obtain virtual angles $h_{n,1}$~$h_{n,M\_n}$ according to the virtual phase difference $b_n$, where the number M_n represents a number of the virtual angles $h_{n,1}$~$h_{n,M\_n}$ corresponding to the virtual phase difference $b_n$. In addition, the virtual angles $h_{n,1}$~$h_{n,M\_n}$ are all between plus or minus 90 degrees, and each virtual angle $h_{n,m}$ among the virtual angles $h_{n,1}$~$h_{n,M\_n}$ would satisfy $$b_n = \frac{2\pi \delta_n \sin(h_{n,m})}{\lambda}. \quad \text{(eq. 4-4)}$$

Note that, detailed operations of the signal processing apparatus 306 obtaining the virtual angles $h_{n,1}$~$h_{n,M\_n}$ according to the virtual phase difference $b_n$ are not limited. For example, the signal processing apparatus 306 may first build up a mapping table containing the corresponding relationship of the virtual angle $h_{n,m}$ and the virtual phase difference $b_n$ as stated in eq. 4-4, and obtain the virtual angles $h_{n,1}$~$h_{n,M\_n}$ according to the virtual phase difference $b_n$ by look-up using the mapping table.

After the signal processing apparatus 306 obtains the plurality of virtual angles, the signal processing apparatus 306 may obtain the DOA $\theta_{DOA}$ according to the physical angle c and the plurality of virtual angles. In an embodiment, the signal processing apparatus 306 may select an optimum virtual angle $h_{n,k}$, among the virtual angles $h_{n,1}$~$h_{n,M\_n}$, to be the DOA $\theta_{DOA}$, so as to avoid problems brought by phase ambiguity. Detailed operations of the signal processing apparatus 306 selecting the optimum virtual angle $h_{n,k}$ among the virtual angles $h_{n,1}$~$h_{n,M\_n}$ are not limited. For example, the signal processing apparatus 306 may select the optimum virtual angle $h_{n,k}$ to be the one (virtual angle) closest to the physical angle c, among the virtual angles $h_{n,1}$~$h_{n,M\_n}$. In another perspective, the optimum virtual angle $h_{n,k}$ would satisfy that a difference between the optimum virtual angle $h_{n,k}$ and the physical angle c is smaller than a threshold $e_1$, i.e., $|h_{n,k}-c|<e_1$, where the threshold $e_1$ may be adjusted according to practical situation.

In another embodiment, after the signal processing apparatus 306 obtains the optimum virtual angle $h_{n,k}$, the signal processing apparatus 306 may further select an optimum virtual angle $h_{n+1,i}$, among virtual angles $h_{n+1,1}$~$h_{n,M\_n+1}$ corresponding to the virtual phase difference $b_{n+1}$, to be the DOA $\theta_{DOA}$, so as to avoid problems brought by phase ambiguity, where the optimum virtual angle $h_{n+1,i}$ is the one (virtual angle) closest to the optimum virtual angle $h_{n,k}$ or the physical angle c among the virtual angles $h_{n+1,1}$~$h_{n+1,M\_n+1}$. In other words, the optimum virtual angle $h_{n+1,i}$ would satisfy that a difference between the optimum virtual angle $h_{n+1,i}$ and the optimum virtual angle $h_{n,k}$ is smaller than a threshold $e_2$, i.e., $|h_{n+1,i}-h_{n,k}|<e_2$, or satisfy that a difference between the optimum virtual angle $h_{n+1,i}$ and the physical angle is smaller than another threshold $e_3$, i.e., $|h_{n+1,i}-c|<e_3$, where the thresholds $e_2$ and $e_3$ may be adjusted according to practical situation.

As can be seen, according to the angle estimation process 40, the signal processing apparatus 306 merely utilizes the signals r1 and r2 received from the antennas Ant_1 and Ant_2, virtualized the plurality of virtual antennas VAnt_1~VAnt_N, and obtains the DOA $\theta_{DOA}$ of the target object TG according to the physical phase difference a and the virtual phase differences $b_1$~$b_N$. Compared to the prior art, the radar system 30 is able to achieve better DOA estimation accuracy, without including more antennas and increasing distance between the antennas, and avoid phase ambiguity at the same time.

Notably, the embodiments stated in the above are utilized for illustrating the concept of the present invention. Those skilled in the art may make modifications and alternations accordingly, and not limited herein. For example, in the angle estimation process 40, the signal processing apparatus computes the plurality of virtual phase differences $b_1$~$b_N$ and obtains the DOA $\theta_{DOA}$ according to the plurality of virtual phase differences $b_1$~$b_N$, which is not limited thereto. The signal processing apparatus may compute one single virtual phase difference b, representing a phase difference between a virtual antenna VAnt and the antenna Ant_1, according to the signals r1 and r2, obtain a plurality of virtual angles corresponding to the virtual phase difference b, and obtain the DOA $\theta_{DOA}$ according to the plurality of virtual angles, which is also within the scope of the present invention. In addition, a virtual distance $\delta$ between the virtual antenna VAnt and the antenna Ant_1 are not limited to be a positive integer times the distance d. The virtual distance $\delta$ may be q times the distance d and the virtual phase difference b can be expressed as $b=qa$ or $$b = \tan^{-1}\left(\frac{\text{Im}\{R^q\}}{\text{Re}\{R^q\}}\right),$$

where q is a real number greater than 1, which is also within the scope of the present invention.

Figure 6:
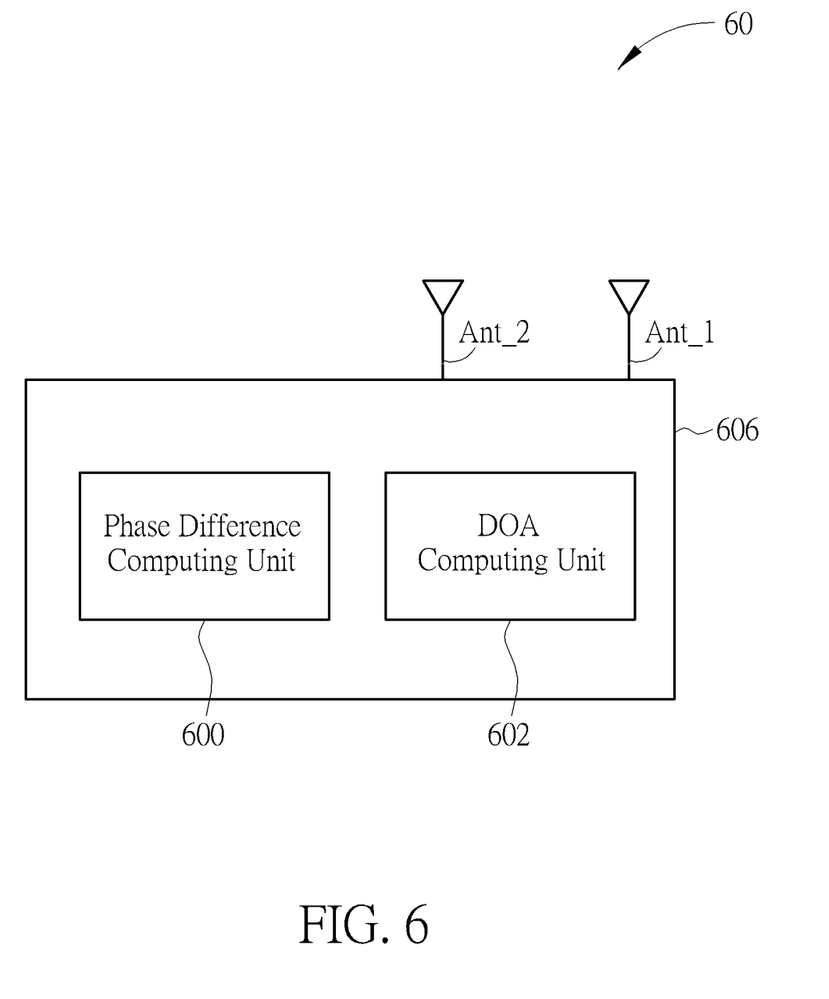
FIG. 6 is a schematic diagram of a radar system according to an embodiment of the present invention.

In addition, the signal processing apparatus is not limited to be realized by any specific circuit structure, which may be realized by an application specific integrated circuit (ASIC). For example, please refer to FIG. 6, which is a schematic diagram of a radar system 60 according to an embodiment of the present invention. The radar system 60 is similar to the radar system 30, and thus, the same components are denoted by the same symbols. The radar system 60 comprises a signal processing apparatus 606, and the signal processing apparatus 606 comprises a phase difference computing unit 600 and a DOA computing unit 602. The phase difference computing unit 600 and the DOA computing unit 602 are all realized by ASIC. The signal processing apparatus 606 may also be utilized to execute the angle estimation process 40, where the phase difference computing unit 600 may be configured to execute Step 404 of the angle estimation process 40 and the DOA computing unit 602 may be configured to execute Step 406 of the angle estimation process 40, which is also within the scope of the present invention.

In summary, the present invention merely utilizes the received signals from two antennas to generate the virtual phase difference (s) between the virtual antenna (s) and the physical antenna, and obtains the DOA of the target object according to the virtual phase difference (s). Compared to the prior art, the present invention is able to achieve better DOA estimation accuracy without including more antennas and increasing distance between the antennas, and also avoid phase ambiguity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An angle estimating method, applied in a radar system, the angle estimating method comprising:
    receiving a first signal and a second signal reflected from a target object via a first antenna and a second antenna;
    obtaining a first phase difference and at least one virtual phase difference according to the first signal and the second signal, wherein the first phase difference is a phase difference between the first antenna and the second antenna; and
    obtaining a direction of arrival (DOA) of the target object according to the first phase difference and the at least one virtual phase difference;
    wherein the step of obtaining the first phase difference and the at least one virtual phase difference according to the first signal and the second signal comprises:
        obtaining a ratio of the first signal and the second signal;
        obtaining the first phase difference according to the ratio; and
        obtaining the at least one virtual phase difference according to the first phase difference.

2. The angle estimating method of claim 1, wherein the step of obtaining the first phase difference and the at least one virtual phase difference according to the first signal and the second signal comprises:
    obtaining the at least one virtual phase difference according to the ratio.

3. The angle estimating method of claim 2, wherein the step of obtaining the at least one virtual phase difference according to the ratio comprises:

$$\text{executing } b = \tan^{-1}\left(\frac{\text{Im}\{R^q\}}{\text{Re}\{R^q\}}\right);$$

wherein b represents a virtual phase difference among the at least one virtual phase difference, q is a real number which is greater than 1, R represents the ratio of the first signal and the second signal, Im{ } represents an imaginary part operator, Re{ } represents a real part operator, and $\tan^{-1}$ represents an inverse function of a tangent function.

4. The angle estimating method of claim 1, wherein the step of obtaining the at least one virtual phase difference according to the first phase difference comprises:
   executing b=qa;
   wherein b represents a virtual phase difference among the at least one virtual phase difference, q is a real number which is greater than 1, and a represents the first phase difference.

5. The angle estimating method of claim 1, wherein the step of obtaining the DOA according to the first phase difference and the at least one virtual phase difference comprises:
   obtaining a first angle corresponding to the first phase difference;
   obtaining a plurality of virtual angles corresponding to the at least one virtual phase difference; and
   obtaining the DOA according to the first angle and the plurality of virtual angles.

6. The angle estimating method of claim 5, wherein the step of obtaining the DOA according to the first phase difference and the at least one virtual phase difference further comprises:
   obtaining a plurality of first virtual angles corresponding to a first virtual phase difference among the at least one virtual phase difference;
   selecting an optimum first virtual angle among the plurality of first virtual angles according to the first angle and the plurality of first virtual angles; and
   obtaining the DOA according to the optimum first virtual angle.

7. The angle estimating method of claim 6, wherein a difference between the optimum first virtual angle and the first angle is smaller than a threshold value, and the DOA is the optimum first virtual angle.

8. The angle estimating method of claim 6, wherein the step of obtaining the DOA according to the optimum first virtual angle further comprises:
   obtaining a plurality of second virtual angles corresponding to a second virtual phase difference among the at least one virtual phase difference;
   selecting an optimum second virtual angle among the plurality of second virtual angles according to the optimum first virtual angle and the plurality of second virtual angles; and
   obtaining the DOA according to the optimum second virtual angle.

9. The angle estimating method of claim 8, wherein a difference between the optimum second virtual angle and the optimum first virtual is smaller than a threshold value, and the DOA is the optimum second virtual angle.

10. A radar system, comprising:
    a first antenna, configured to receive a first signal reflected from a target object;
    a second antenna, configured to receive a second signal reflected from the target object;
    a processing unit, coupled to the first antenna and the second antenna; and
    a storage unit, configured to store a program code, the program code instructing the processing unit to perform following steps:
       obtaining a first phase difference and at least one virtual phase difference according to the first signal and the second signal, wherein the first phase difference is a phase difference between the first antenna and the second antenna, and the at least one virtual phase difference is phase difference between the first antenna and at least one virtual antenna; and
       obtaining a direction of arrival (DOA) of the target object according to the first phase difference and the at least one virtual phase difference;
    wherein the program code further instructs the processing unit to perform the following steps, for obtaining the first phase difference and the at least one virtual phase difference according to the first signal and the second signal comprises:
       obtaining a ratio of the first signal and the second signal;
       obtaining the first phase difference according to the ratio; and
       obtaining the at least one virtual phase difference according to the first phase difference.

11. The radar system of claim 10, wherein the program code further instructs the processing unit to perform the following steps, for obtaining the first phase difference and the at least one virtual phase difference according to the first signal and the second signal:
    obtaining the at least one virtual phase difference according to the ratio.

12. The radar system of claim 11, wherein the program code further instructs the processing unit to perform the following step, for obtaining the at least one virtual phase difference according to the ratio:

$$\text{executing } b = \tan^{-1}\left(\frac{\text{Im}\{R^q\}}{\text{Re}\{R^q\}}\right);$$

wherein b represents a virtual phase difference among the at least one virtual phase difference, q is a real number which is greater than 1, R represents the ratio of the first signal and the second signal, Im{ } represents an imaginary part operator, Re{ } represents a real part operator, and $\tan^{-1}$ represents an inverse function of a tangent function.

13. The radar system of claim 10, wherein the program code further instructs the processing unit to perform the following step, for obtaining the DOA according to the first phase difference and the at least one virtual phase difference:
    obtaining a first angle corresponding to the first phase difference;
    obtaining a plurality of virtual angles corresponding to the at least one virtual phase difference; and
    obtaining the DOA according to the first angle and the plurality of virtual angles.

14. The radar system of claim 10, wherein the program code further instructs the processing unit to perform the following step, for obtaining the DOA according to the first phase difference and the at least one virtual phase difference:
    obtaining a plurality of first virtual angles corresponding to a first virtual phase difference among the at least one virtual phase difference;

selecting an optimum first virtual angle among the plurality of first virtual angles according to the first angle and the plurality of first virtual angles; and obtaining the DOA according to the optimum first virtual angle.

15. A radar system, comprising:
a first antenna, configured to receive a first signal reflected from a target object;
a second antenna, configured to receive a second signal reflected from the target object;
a phase difference computing unit, configured to obtain a first phase difference and at least one virtual phase difference according to the first signal and the second signal, wherein the first phase difference is a phase difference between the first antenna and the second antenna, and the at least one virtual phase difference is phase difference between the first antenna and at least one virtual antenna; and
a direction of arrival (DOA) computing unit, configured to obtain a DOA of the target object according to the first phase difference and the at least one virtual phase difference;
wherein the phase difference computing unit is further configured to perform the following steps, for obtaining the first phase difference and the at least one virtual phase difference according to the first signal and the second signal:
obtaining a ratio of the first signal and the second signal;
obtaining the first phase difference according to the ratio; and
obtaining the at least one virtual phase difference according to the first phase difference.

16. The radar system of claim 15, wherein the phase difference computing unit is further configured to perform the following steps, for obtaining the first phase difference and the at least one virtual phase difference according to the first signal and the second signal:
obtaining the at least one virtual phase difference according to the ratio.

17. The radar system of claim 16, wherein the phase difference computing unit is further configured to perform the following step, for obtaining the at least one virtual phase difference according to the ratio:

$$\text{executing } b = \tan^{-1}\left(\frac{\text{Im}\{R^q\}}{\text{Re}\{R^q\}}\right);$$

wherein b represents a virtual phase difference among the at least one virtual phase difference, q is a real number which is greater than 1, R represents the ratio of the first signal and the second signal, Im{ } represents an imaginary part operator, Re{ } represents a real part operator, and $\tan^{-1}$ represents an inverse function of a tangent function.

18. The radar system of claim 15, wherein the DOA computing unit is further configured to perform the following steps, for obtaining the DOA according to the first phase difference and the at least one virtual phase difference:
obtaining a first angle corresponding to the first phase difference;
obtaining a plurality of virtual angles corresponding to the at least one virtual phase difference; and
obtaining the DOA according to the first angle and the plurality of virtual angles.

19. The radar system of claim 18, wherein the DOA computing unit is further configured to perform the following steps, for obtaining the DOA according to the first phase difference and the at least one virtual phase difference:
obtaining a plurality of first virtual angles corresponding to a first virtual phase difference among the at least one virtual phase difference;
selecting an optimum first virtual angle among the plurality of first virtual angles according to the first angle and the plurality of first virtual angles; and
obtaining the DOA according to the optimum first virtual angle.

* * * * *

UNITED STATES PATENT AND TRADEMARK OFFICE
CERTIFICATE OF CORRECTION

PATENT NO. : 10,267,906 B2
APPLICATION NO. : 15/249490
DATED : April 23, 2019
INVENTOR(S) : Chi-Cheng Kuo et al.

Page 1 of 1

It is certified that error appears in the above-identified patent and that said Letters Patent is hereby corrected as shown below:

On the Title Page

Item (73), correct the country of the assignee from "Hsinchu, Taiwan (CN)" to --Hsinchu (TW)--.

Signed and Sealed this
Twenty-fifth Day of June, 2019

Andrei Iancu
*Director of the United States Patent and Trademark Office*